United States Patent
Liu

(10) Patent No.: US 12,238,656 B2
(45) Date of Patent: Feb. 25, 2025

(54) RATE MATCHING INDICATION METHOD AND APPARATUS, AND DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 540 days.

(21) Appl. No.: 17/629,352

(22) PCT Filed: Jul. 25, 2019

(86) PCT No.: PCT/CN2019/097685
§ 371 (c)(1),
(2) Date: Jan. 21, 2022

(87) PCT Pub. No.: WO2021/012256
PCT Pub. Date: Jan. 28, 2021

(65) Prior Publication Data
US 2022/0256487 A1    Aug. 11, 2022

(51) Int. Cl.
*H04W 56/00* (2009.01)
*H04L 1/00* (2006.01)
*H04L 27/26* (2006.01)
*H04W 72/0446* (2023.01)
*H04W 72/1263* (2023.01)
*H04W 72/20* (2023.01)

(52) U.S. Cl.
CPC ......... *H04W 56/001* (2013.01); *H04L 1/0067* (2013.01); *H04L 27/26025* (2021.01); *H04W 72/0446* (2013.01); *H04W 72/1263* (2013.01); *H04W 72/20* (2023.01)

(58) Field of Classification Search
None
See application file for complete search history.

(56) References Cited

U.S. PATENT DOCUMENTS 10,880,869 B2 * 12/2020 Hwang ............ H04W 72/0453
                                                    370/329
2019/0068348 A1   2/2019 Nam
(Continued)

FOREIGN PATENT DOCUMENTS

CN    108401526 A    8/2018
CN    109451799 A    3/2019
(Continued)

OTHER PUBLICATIONS

Samsung, "Corrections on Rate Matching", 3GPP TSG RAN WG1 Meeting AH 1801,R1-1800462, Vancouver, Canada, Jan. 22-26, 2018,(3p).
(Continued)

*Primary Examiner* — Minh Trang T Nguyen
(74) *Attorney, Agent, or Firm* — Arch & Lake LLP

(57) ABSTRACT

A rate matching indication method is provided. The method includes: a base station sends a synchronization signal block SSB 0 and a synchronization signal block SSB 1 in a time slot, where the SSB 0 carries a first indication, and the first indication indicates, to a terminal, the use of a rate matching manner that deducts time-frequency resources occupied by the SSB 1.

17 Claims, 6 Drawing Sheets

(56) References Cited

U.S. PATENT DOCUMENTS

| | | |
|---|---|---|
| 2019/0149383 A1 | 5/2019 | Ko et al. |
| 2019/0150123 A1* | 5/2019 | Nogami .............. H04W 72/542 |
| | | 370/330 |
| 2019/0288820 A1* | 9/2019 | Lyu ....................... H04W 72/04 |
| | | 370/329 |
| 2020/0092062 A1 | 3/2020 | Yum et al. |
| 2020/0413356 A1* | 12/2020 | Wang .................. H04W 72/046 |
| | | 370/350 |
| 2021/0051641 A1* | 2/2021 | Si ...................... H04W 56/0015 |
| | | 370/330 |
| 2021/0051683 A1* | 2/2021 | Li ......................... H04W 72/12 |
| | | 370/254 |
| 2021/0235491 A1* | 7/2021 | Iyer .................... H04W 74/002 |
| | | 370/329 |
| 2021/0258901 A1* | 8/2021 | He ....................... H04W 72/30 |
| | | 370/329 |
| 2021/0392687 A1* | 12/2021 | Liang ................. H04W 56/001 |
| | | 370/329 |
| 2022/0104251 A1* | 3/2022 | Noh ....................... H04W 74/08 |
| | | 370/329 |
| 2022/0201519 A1* | 6/2022 | Huang .................. H04W 24/10 |
| | | 370/252 |

FOREIGN PATENT DOCUMENTS

| | | |
|---|---|---|
| CN | 109802803 A | 5/2019 |
| CN | 109863706 A | 6/2019 |
| CN | 110022191 A | 7/2019 |
| CN | 110035510 A | 7/2019 |
| WO | 2019047228 A1 | 3/2019 |

OTHER PUBLICATIONS

International Search Report of PCT Application No. PCT/CN2019/097685 dated Apr. 24, 2020 with English translation, (4p).

* cited by examiner

RATE MATCHING INDICATION METHOD AND APPARATUS, AND DEVICE AND STORAGE MEDIUM

CROSS REFERENCE TO RELATED APPLICATION

The present application is a U.S. National Phase Applications of International Patent Application Serial No. PCT/CN2019/097685 filed on Jul. 25, 2019. The entire contents of the above-cited application are hereby incorporated by reference in their entireties for all purposes.

BACKGROUND

The study of new radio unlicensed (NR-U) is carried out in a Third Generation Partnership Project (3GPP). Abase station needs to send a synchronization signal block (SSB) to user equipment (UE), so that the UE performs initial access.

In the NR-U, Listen Before Talk (LBT) needs to be performed when the base station sends data to the UE. LBT refers to that the base station, upon intercepting that the new radio unlicensed is in an idle state, can occupy a certain duration on the new radio unlicensed to perform sending of the data or signaling. For instance, when LBT is successful, the base station sends 2 SSBs and corresponding remaining minimum system information (RMSI) to the UE within 1 ms.

SUMMARY

The present disclosure relates to the field of communication, in particular to a rate matching indication method and apparatus, a device and a storage medium. The technical solution is as follows.

According to a first aspect of the present disclosure, a rate matching indication method applied to an access network device of an NR-U is provided. The method includes:
  sending an SSB 0 and an SSB 1 in a time slot, where the SSB 0 carries a first indication, and the first indication indicates, to a terminal, that a rate matching mode of deducting a time-frequency resource occupied by the SSB 1 is adopted.

According to a second aspect of the present disclosure, a rate matching indication method applied to a terminal of an NR-U is provided. The method includes:
  receiving an SSB 0 in a time slot, where the SSB 0 carries a first indication, and the first indication indicates a rate matching mode of deducting a time-frequency resource occupied by an SSB 1 in the time slot.

According to a third aspect of the present disclosure, an access network device is provided. The access network device includes:
  a processor; and
  a memory, storing an executable instruction.
The processor is configured to load and execute the executable instruction so as to realize the rate matching indication method according to the first aspect.

According to a fourth aspect of the present disclosure, a terminal is provided. The terminal includes:
  a processor; and
  a memory, storing an executable instruction.
The processor is configured to load and execute the executable instruction so as to realize the rate matching indication method according to the second aspect.

According to a fifth aspect of the present disclosure, a computer readable storage medium is provided. The computer readable storage medium stores an executable instruction, and the executable instruction is loaded and executed by a processor so as to realize the rate matching indication method according to the first or second aspect.

It should be understood that the above general description and the following detailed description are only exemplary and explanatory, and cannot limit the disclosure.

DETAILED DESCRIPTION

Examples will be described in detail herein, instances of which are illustrated in the accompanying drawings. When the following description refers to the accompanying drawings, the same numbers in different drawings represent the same or similar elements unless otherwise indicated. The implementations described in the following examples do not represent all implementations consistent with the disclosure. On the contrary, they are merely instances of an apparatus and a method consistent with some aspects of the disclosure as detailed in the appended claims.

Communication systems and business scenarios described in the examples of the disclosure are intended to more clearly illustrate technical solutions of the examples of the disclosure, and do not constitute a limitation on the technical solutions provided by the examples of the disclosure. Those of ordinary skill in the art will know that with the evolution of the communication systems and the emergence of new business scenarios, the technical solutions provided in the examples of the disclosure are equally applicable to similar technical problems.

Figure 1:
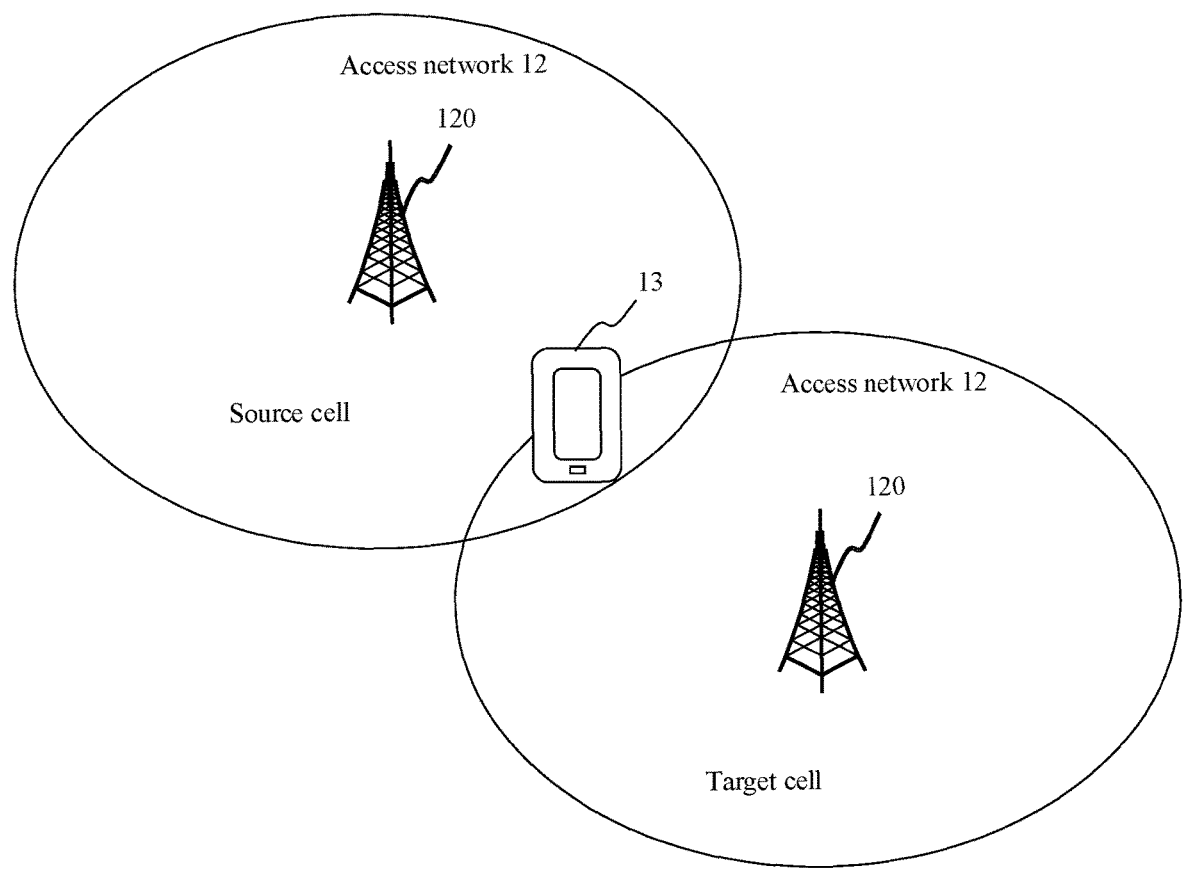
FIG. 1 is a structural block diagram of a communication system illustrated by an example.

FIG. 1 illustrates a block diagram of a communication system provided by an example of the disclosure. The communication system may include: an access network 12 and a terminal 13.

The access network 12 includes a plurality of access network devices 120. Each access network device 120 may be a base station which is an apparatus deployed in the access network and configured to provide a wireless communication function for the terminal. The base station may include various forms of macro base stations, micro base stations, relay stations, access points, and so on. In systems using different wireless access technologies, names of devices with base station functions may be different. For instance, in LTE systems, they are called eNodeB or eNB; and in 5G NR-U systems, they are called gNodeB or gNB. With the evolution of communication technology, the description of "base stations" may change. For convenience, in the examples of the disclosure, the above-mentioned devices that provide wireless communication functions for the terminal 13 are collectively referred to as access network devices. For example, each access network device 120 includes: a source base station and a target base station.

The terminal 13 may include various handheld devices, vehicle-mounted devices, wearable devices, and computing devices with a wireless communication function, or other processing devices connected to a wireless modem, as well as various forms of user equipment (UE), mobile stations (MSs), terminal devices, etc. For convenience of description, the devices mentioned above are collectively referred to as terminals. Mutual communication is achieved between the access network devices 120 and the terminal 13 through a certain type of air interface technology, such as a Uu interface.

After the terminal is turned on, the terminal accesses a cell by executing cell search and through a random access process. In an NR-U, cell search is mainly completed on the basis of detection of a downlink synchronization channel and signal. The terminal obtains a cell ID, frequency synchronization, and downlink time synchronization through a cell search process. Among them, the cell search process further includes: primary synchronization signal (PSS) search, secondary synchronization signal (SSS) search, and physical broadcast channel (PBCH) detection.

The downlink synchronization channel and signal include a plurality of synchronization signal block sets, each synchronization signal block set including one or a plurality of synchronization signal blocks. Each synchronization signal block includes: sending of the PSS, the SSS and the PBCH.

A design object of an NR system is to support a carrier frequency of 0 to 100 GHz. However, when the system works in a millimeter wave frequency band, it often needs to use beamforming technology to provide cell coverage. At the same time, due to hardware limitations, a base station often cannot transmit multiple beams covering the entire cell at the same time, so beam scanning technology is introduced to solve the problem of cell coverage.

Figure 2:
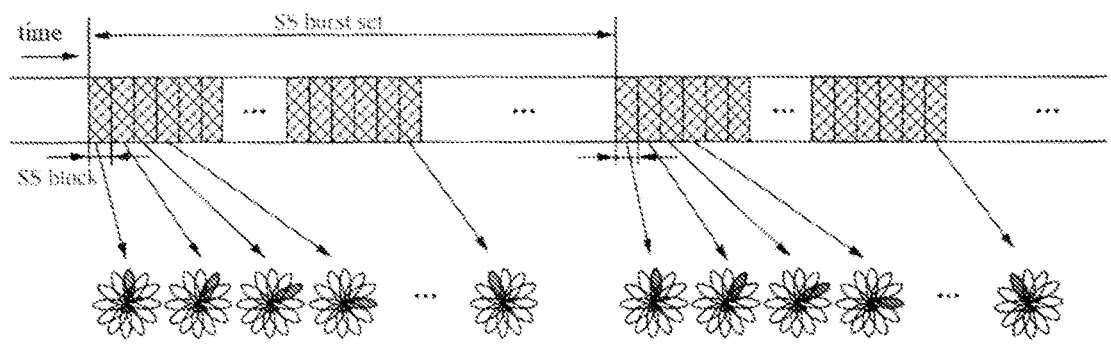
FIG. 2 is a flow chart of a sending method of a synchronization signal block set illustrated by an example.

The so-called "bean scanning" refers to that, the base station only sends in one or several beam directions at a certain moment. Different beams are sent at multiple moments to cover all directions required for the entire cell. The SSB set is designed for beam scanning, and is used to send the PSS, the SSS, and the PBCH required for cell search by the terminal in different beam directions (these signals form a synchronization signal block). The synchronization signal block set (SS burst set) is a set of a plurality of SSBs in a certain period of time, and each SSB corresponds to a beam direction in the same period. The beam directions of the SSBs in the same SS burst set covers the entire cell. FIG. 2 shows a schematic diagram of sending an SSB in different beam directions at multiple moments. However, it should be noted that when the NR system works at a low frequency and does not need to use the beam scanning technology, the use of the SS burst set is still beneficial to improving the cell coverage, because when the UE receives a plurality of time division multiplexing synchronization signal blocks in the SS burst set, it may accumulate more energy. For example, an SS burst set is limited to a certain half-frame of 5 ms, and starts from the $0^{th}$ time slot of the half-frame.

Figure 3:
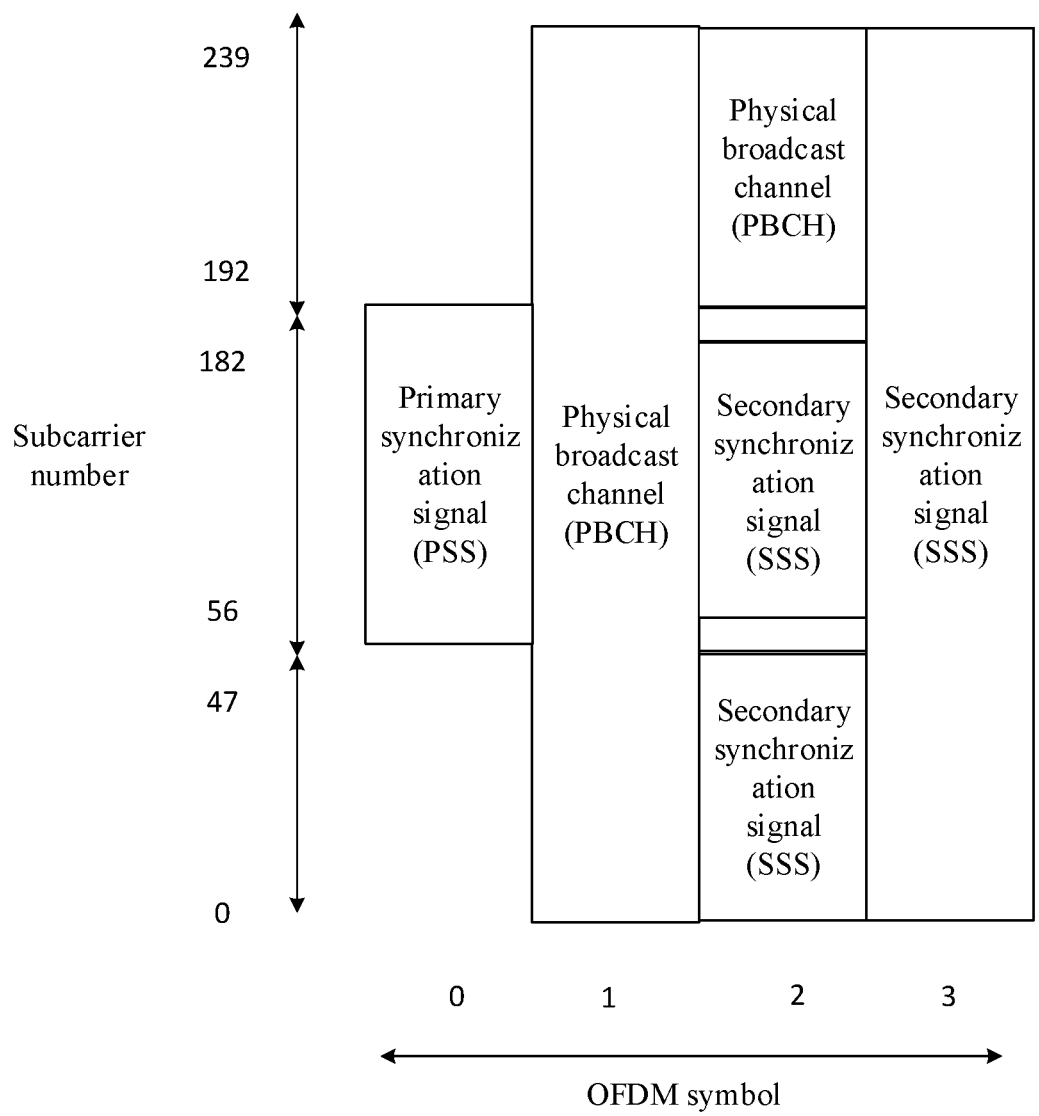
FIG. 3 is a schematic diagram of an interface of a synchronization signal block illustrated by an example.

As shown in FIG. 3, an SSB occupies 4 OFDM symbols in a time domain, and index labeling is performed inside the SSB from 0 to 3; and in a frequency domain, the SSB occupies a frequency domain width of 20 RBs, occupying 240 subcarriers (each RB contains 12 subcarriers) at most, and RB indexes and subcarrier indexes in the frequency domain may be labeled in an ascending order starting from 0 respectively.

The UE first searches for the PSS. The PSS is a pseudo-random sequence with a length of 127 bits, and a frequency domain BPSK M sequence is adopted. The PSS is mapped to 127 consecutive subcarriers (56 to 182) among 12 PRBs, occupying 144 subcarriers, with protective intervals on both sides, and no power transmission is performed. After searching the PSS, the UE may obtain a subcarrier spacing of the SSB.

A frequency domain of the SSS is similar to that of the PSS, and the SSS is mapped to 127 consecutive subcarriers among the 12 PRBs, occupying 144 subcarriers. After searching the SSS, the UE may obtain a unique physical layer cell ID.

After the UE searches the PSS/SSS and obtains a physical layer cell ID, it then needs to demodulate the PBCH. To demodulate the PBCH, it needs to obtain a location of DMRS of the PBCH. The DMRS of the PBCH is at a same location as the PBCH in the time domain, the DMRS and the PBCH are spaced by 4 subcarriers in the frequency domain, and an initial offset is determined by the physical layer cell ID.

After the UE obtains the SSB, it further needs to obtain some necessary system information before it is resided in the cell and completes initial access. This necessary system information is called RMSI in the NR. In some perspectives, the RMSI may be regarded as an SIB1 message in LTE, which is mainly sent through a PDSCH, and the PDSCH needs DCI of a PDCCH for scheduling. The UE needs to obtain the PDCCH channel information for scheduling the RMSI in a master information block (MIB), and perform blind detection on the PDCCH to obtain the RMSI. This information in the MIB is a pdcch-ConfigSIB1 field. The MIB is obtained by the UE from the SSB.

For example, the UE may confirm whether a common control resource set (CORESET) is included in a frequency domain where a current SSB is located by issuing a parameter ssb-Subcarrier Offset in the MIB, that is, a Type0-PDCCH common search space is configured, from which it can be judged whether the frequency domain where the current SSB is located in the cell is configured with the RMSI. Under certain conditions, when the UE detects that the frequency domain where the current SSB is located in the cell is not configured with the RMSI, it may detect, through a parameter pdcch-ConfigSIB1 contained in the MIB message, whether the CORESET is provided in the Type0-PDCCH common search space of a range of a frequency domain where a next SSB is located and a certain offset range of the current SSB. If the UE still fails to detect the common CORESET, it may be considered that the cell is not configured with the RMSI, and then a cell search procedure for a corresponding frequency point obtained by a previously-locked SSB is abandoned.

The "PDCCH and PDSCH of SSB+RMSI" may be together defined as a discovery reference signal (DRS). The DRS sends a continuous 1 ms at most.

Figure 4:
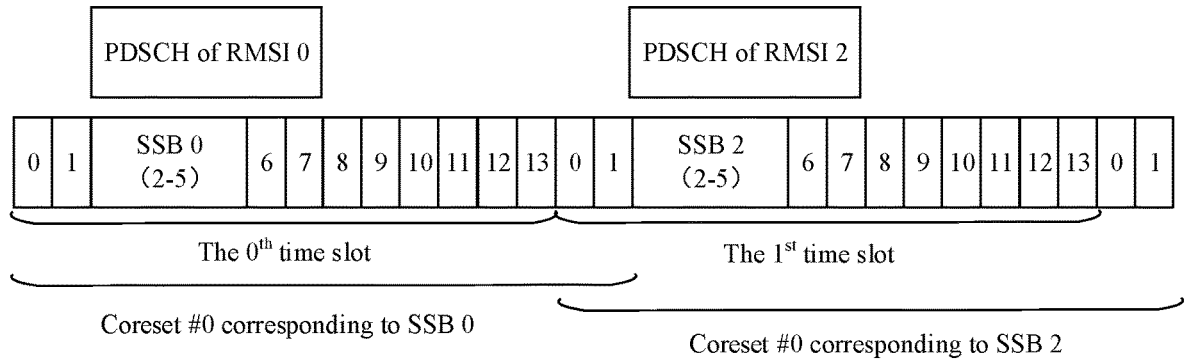
FIG. 4 is a location diagram of time-frequency resources of two SSBs and corresponding RMSI illustrated by another example.

Under a condition that the subcarrier spacing is 30 kHz, FIG. 4 illustrates a possible design where the base station sends the SSB and the RMSI in two consecutive time domains. An SSB0 is sent in the $2^{nd}$ to the $5^{th}$ symbols in the $0^{th}$ time slot, and a PDSCH of RMSI 0 is sent in the $2^{nd}$ to the $7^h$ symbols in the $0^{th}$ time slot; and an SSB2 is sent in the $2^{nd}$ to the $5^{th}$ symbols in the $1^{th}$ time slot, and a PDSCH of RMSI 2 is sent in the $2^{nd}$ to the $7^h$ symbols in the $1^{st}$ time slot.

Among them, a search space (Coreset #0) of the PDCCH of the RMSI 0 includes: the $0^{th}$ symbol and the $1^{st}$ symbol in the $0^{th}$ time slot, and the $0^{th}$ symbol and the $1^{st}$ symbol in the $1^{st}$ time slot. A search space (Coreset #0) of the PDCCH of the RMSI 2 includes: the $0^{th}$ symbol and the $1^{st}$ symbol in the $1^{st}$ time slot, and the $0^{th}$ symbol and the $1^{st}$ symbol in the $2^{nd}$ time slot.

In the possible design, 28 consecutive symbols are required for completing sending of the SSB, exceeding a length of 1 ms (26 symbols). 4 SSBs and corresponding RMSI cannot be sent within 1 ms, so the base station needs to send the 4 SSBs by 2 times, i.e. needs two LBTs. One more LBT will cause a delay and an increase in power consumption of the UE, as well as degradation of system performance. For this purpose, the following examples are provided.

Figure 5:
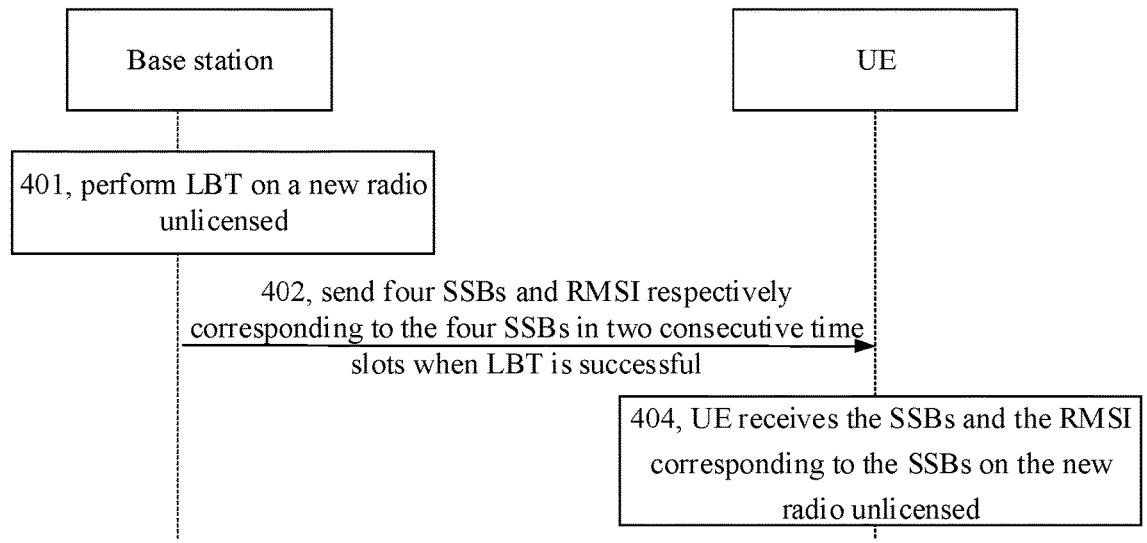
FIG. 5 is a flow chart of a sending method of a synchronization signal block illustrated by an example.

The inventor found that a base station fails to simultaneously send 4 SSBs within 1 ms (longest single transmission time of a DRS) because there are no corresponding transmission modes for PDSCHs of RMSI corresponding to the 4 SSBs. FIG. 5 illustrates a flow chart of a sending method of a synchronization signal block illustrated by an example of the disclosure. The method may be executed by an access network device and a terminal under an NR-U scenario, taking the access network device being a base station as an instance. The method includes:

Step 401, the base station performs LBT on a new radio unlicensed.

The base station needs to first perform LBT before using the new radio unlicensed, such as LBT at a level of LBT Cat2, or LBT at a level of LBT Cat4, etc. This example does not limit an LBT mode of the base station.

When LBT is successful, step 604 is executed; or when LBT fails, the base station performs back-off.

Step 402, when LBT is successful, the base station sends four SSBs and RMSI respectively corresponding to the four SSBs in two consecutive time domains.

Figure 6:
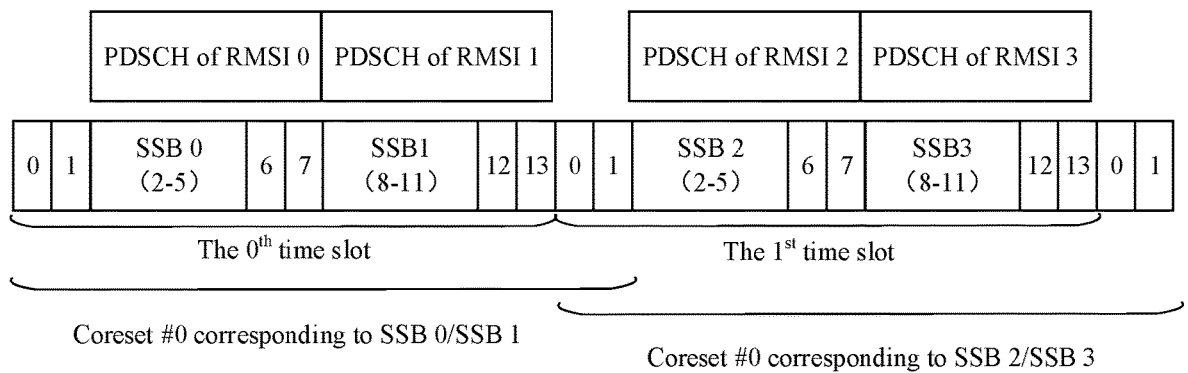
FIG. 6 is a location diagram of time-frequency resources of four SSBs and corresponding RMSI illustrated by another example.

For example, a subcarrier spacing of the two time slots is 30 kHz, and each time slot includes 14 symbols. Taking the four SSBs including: an SSB0, an SSB1, an SSB2, and an SSB3 as an instance, as shown in FIG. 6, the two consecutive time slots include: the $0^{th}$ time slot and the $1^{st}$ time slot.

The SSB 0 as well as a PDCCH and a PDSCH of RMSI 0 corresponding to the SSB 0, and the SSB 1 as well as a PDCCH and a PDSCH of RMSI 1 corresponding to the SSB 1 are sent in the $0^{th}$ time slot. The SSB 2 as well as a PDCCH and a PDSCH of RMSI 2 corresponding to the SSB 2, and the SSB 3 as well as a PDCCH and a PDSCH of RMSI 3 corresponding to the SSB 3 are sent in the $1^{st}$ time slot.

The SSB 0 is borne on the $2^{nd}$ to the $5^{th}$ symbols in the $0^{th}$ time slot, the PDCCH of the RMSI 0 corresponding to the SSB 0 is borne on the $0^{th}$ symbol in the $0^{th}$ time slot, and the PDSCH of the RMSI 0 corresponding to the SSB 0 is borne on the $2^{nd}$ to the $7^{th}$ symbols in the $0^{th}$ time slot. The SSB 0 and the PDSCH of the RMSI 0 adopt a frequency division multiplexing (FDM) mode.

The SSB 1 is borne on the $8^{th}$ to the $11^{th}$ symbols in the $0^{th}$ time slot, the PDCCH of the RMSI 1 corresponding to the SSB 1 is borne on the $1^{st}$ symbol in the $0^{th}$ time slot, and the PDSCH of the RMSI 1 corresponding to the SSB 1 is borne on the $8^{th}$ to the $11^{th}$ symbols in the $0^{th}$ time slot. The SSB 1 and the PDSCH of the RMSI 1 adopt a frequency division multiplexing (FDM) mode.

The SSB 2 is borne on the $2^{nd}$ to the $5^{th}$ symbols in the $1^{st}$ time slot, the PDCCH of the RMSI 2 corresponding to the SSB 2 is borne on the $0^{th}$ symbol in the $1^{st}$ time slot, and the PDSCH of the RMSI 2 corresponding to the SSB 2 is borne on the $2^{nd}$ to the $7^{th}$ symbols in the $1^{st}$ time slot. The SSB 2 and the PDSCH of the RMSI 2 adopt a frequency division multiplexing (FDM) mode.

The SSB 3 is borne on the $8^{th}$ to the $11^{th}$ symbols in the $1^{st}$ time slot, the PDCCH of the RMSI 3 corresponding to the SSB 3 is borne on the $1^{st}$ symbol in the $1^{st}$ time slot, and the PDSCH of the RMSI 3 corresponding to the SSB 3 is borne on the $8^{th}$ to the $11^{th}$ symbols in the $1^{st}$ time slot. The SSB 3 and the PDSCH of the RMSI 3 adopt a frequency division multiplexing (FDM) mode.

For example, each of the four SSBs adopts a different beam for scanning and sending, that is, the four SSBs are sent separately in a beam scanning mode.

Step 404, UE receives an SSB and the RMSI corresponding to the SSB on the new radio unlicensed. The SSB and the corresponding RMSI are one group in the four SSBs and the RMSI respectively corresponding to the four SSBs sent by the base station in the two consecutive time slots.

When the UE is within a coverage range of a cell provided by the base station, the UE receives one group of SSB and RMSI. The group of SSB and RMSI is one group in the four groups of SSBs and RMSI, i.e. the SSB 0 and the RMSI 0, or the SSB 1 and the RMSI 1, or the SSB 2 and the RMSI 2, or the SSB 3 and the RMSI 3.

To sum up, the method provided by the example provides a mode of simultaneously sending the four SSBs and the corresponding RMSI within 1 ms (the longest single transmission time of the DRS) under the NR-U scenario. The base station can simultaneously send the four SSBs and the corresponding RMSI when it only needs to perform LBT once, so an LBT frequency of the base station is reduced, a throughput capacity of a communication system is improved, and an electric quantity of the UE can be saved.

In the example based on FIG. 6, for the above step 402, sending the RMSI respectively corresponding to the four SSBs in the two consecutive time slots includes the following steps:

based on first configuration, the PDCCH of the RMSI corresponding to the SSB 0 is sent at the $0^{th}$ symbol in the $0^{th}$ time slot; the PDCCH of the RMSI corresponding to the SSB 1 is sent at the $1^{st}$ symbol in the $0^{th}$ time slot; the PDCCH of the RMSI corresponding to the SSB 2 is sent at the $0^{th}$ symbol in the $1^{st}$ time slot; and the PDCCH of the RMSI corresponding to the SSB 3 is sent at the $1^{st}$ symbol in the $1^{st}$ time slot;

based on second configuration, the PDSCH of the RMSI corresponding to the SSB 0 is sent at the $2^{nd}$ to the $6^{th}$ symbols in the $0^{th}$ time slot; and the PDSCH of the RMSI corresponding to the SSB 2 is sent at the $2^{nd}$ to the $6^{th}$ symbols in the $1^{st}$ time slot; and based on third configuration, the PDSCH of the RMSI corresponding to the SSB 1 is sent at the $8^{th}$ to the $13^{th}$ symbols in the $0^{th}$ time slot; and the PDSCH of the RMSI corresponding to the SSB 3 is sent at the $8^{th}$ to the $13^{th}$ symbols in the $1^{st}$ time slot.

In one instance, the first configuration includes configuration information of a PDCCH common search space of a type 0. The configuration information of the PDCCH common search space of the type 0 is as follows:

$$n_0 = (O*2_\mu + [i*M]) \bmod N_{slot}^{frame};$$

wherein M=½, O=0, $\mu$ is the subcarrier spacing, i is an index of the SSBs, $n_0$ is an index of the time slots, $N_{slot}^{frame,\mu}$ is the time slot number of each subframe configured by the subcarrier spacing, and mod is modulus operation. Each time slot has two search space sets.

In combination with FIG. 5, although a Coreset #0 search space determined based on the above configuration information includes: the $0^{th}$ symbol and the $1^{st}$ symbol in a current time slot as well as the $0^{th}$ symbol and the $1^{st}$ symbol in a next time slot, the UE only needs to search the $0^{th}$ symbol and the $1^{st}$ symbol in the current time slot and does not need to search the $0^{th}$ symbol and the $1^{st}$ symbol in the next time slot. The 4 SSBs and the RMSI may be sent within 1 ms (26 symbols). That is, after the UE receives the SSB 2 and the SSB 3, it does not need to search the last 2 symbols (the $0^{th}$ symbol and the $1^{st}$ symbol in the $2^{nd}$ time slot) in FIG. 5, but only needs to search the $0^{th}$ symbol and the $1^{st}$ symbol in the $1^{st}$ time slot.

In one instance, a table of configuration of the PDSCH of the RMSI provided by the example of the disclosure is shown as Table 1 below.

TABLE 1

| Index row | Location of type A of DMRS | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 (or 6) |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 8 | 6 (or 5) |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In one instance, the second configuration includes: a time slot offset $K_0$ of the PDSCH is 0, a starting symbol S is 2, an allocation length L is 5 (or 6), a resource mapping type is a type A, and a location of the type A of DMRS is 2.

For example, when the allocation length L is 5, the PDSCH of the RMSI 0 of the SSB 0 (or the SSB 2) is borne on the $2^{nd}$ to the $6^{th}$ symbols; and when the allocation length L is 6, the PDSCH of the RMSI 0 of the SSB 0 (or the SSB 2) is borne on the $2^{nd}$ to the $7^{th}$ symbols.

For example, in combination with Table 1, the second configuration may adopt configuration of the PDSCH of the RMSI with an index number of 5. In combination with FIG. 5, the PDCCH of the RMSI 0 corresponding to the SSB 0 carries the second configuration, and is located on the $0^{th}$ symbol in the $0^{th}$ time slot; and the PDCCH of the RMSI 2 corresponding to the SSB 2 carries the second configuration, and is located on the $0^{th}$ symbol in the $1^{st}$ time slot.

In one instance, the third configuration includes: the time slot offset $K_0$ of the PDSCH is 0, the starting symbol S is 8, the allocation length L is 6, the resource mapping type is the type A, and the location of the type A of the DMRS is 2.

For example, in combination with Table 1, the third configuration may adopt configuration of the PDSCH of the RMSI with an index number of 13. In combination with FIG. 5, the PDCCH of the RMSI 1 corresponding to the SSB 1 carries the third configuration, and is located on the $1^{st}$ symbol in the $0^{th}$ time slot; and the PDCCH of the RMSI 3 corresponding to the SSB 3 carries the third configuration, and is located on the $1^{st}$ symbol in the $1^{st}$ time slot.

In one instance, a definition of PDSCH configuration needs to be added in the example of the present disclosure, as shown in Table 2 below.

TABLE 2

| PDSCH configuration type | $K_0$ | S | L |
|---|---|---|---|
| Type A | 0 | 8 | 6 (or 5) |

For example, when the allocation L is 6, the PDSCH of the RMSI 1 of the SSB 1 (or the SSB 3) is borne on the $8^{th}$ to the $13^{th}$ symbols; and when the allocation length L is 5, the PDSCH of the RMSI 1 of the SSB 1 (or the SSB 3) is borne on the $8^{th}$ to the $12^{th}$ symbols.

In the example based on FIG. 6, for the above step 404, the UE receiving the SSB 0 and the RMSI 0 corresponding to the SSB 0 includes the following steps:

the SSB 0 is received on the $2^{nd}$ to the $5^{th}$ symbols in the $0^{th}$ time slot of the new radio unlicensed; the PDCCH of the RMSI 0 corresponding to the SSB 0 is received on the $0^{th}$ symbol in the $0^{th}$ time slot according to the first configuration of the SSB 0; and the PDSCH of the RMSI 0 corresponding to the SSB 0 is received on the $2^{nd}$ to the $A^{th}$ symbol in the $0^{th}$ time slot according to the second configuration in the PDCCH of the RMSI 0 corresponding to the SSB 0.

A is 6 or 7. The example is described taking A being 7 as an instance.

In the example based on FIG. 6, for the above step 404, the UE receiving the SSB 1 and the RMSI 1 corresponding to the SSB 1 includes the following steps:

the SSB 1 is received on the $8^{th}$ to the $11^{th}$ symbols in the $0^{th}$ time slot of the new radio unlicensed; the PDCCH of the RMSI 1 corresponding to the SSB 1 is received on the $1^{st}$ symbol in the $0^{th}$ time slot according to the first configuration of the SSB 1; and the PDSCH of the RMSI 1 corresponding to the SSB 1 is received on the $8^{th}$ to the $B^{th}$ symbol in the $0^{th}$ time slot according to the third configuration in the PDCCH of the RMSI 1 corresponding to the SSB 1.

B is 12 or 13. The example is described taking B being 13 as an instance.

In the example based on FIG. 6, for the above step 404, the UE receiving the SSB 2 and the RMSI 2 corresponding to the SSB 2 includes the following steps:

the SSB 2 is received on the $2^{nd}$ to the $5^{th}$ symbols in the $1^{st}$ time slot of the new radio unlicensed; the PDCCH of the RMSI 2 corresponding to the SSB 2 is received on the $0^{th}$ symbol in the $1^{st}$ time slot according to the first configuration of the SSB 2; and the PDSCH of the RMSI 2 corresponding to the SSB 2 is received on the $2^{nd}$ to the $A^{th}$ symbol in the $1^{st}$ time slot according to the second configuration in the PDCCH of the RMSI 2 corresponding to the SSB 2.

A is 6 or 7. The example is described taking A being 7 as an instance.

In the example based on FIG. 6, for the above step 404, the UE receiving the SSB 3 and the RMSI 3 corresponding to the SSB 3 includes the following steps:

the SSB 3 is received on the $8^{th}$ to the $11^{th}$ symbols in the $2^{nd}$ time slot of the new radio unlicensed; the PDCCH of the RMSI 3 corresponding to the SSB 3 is received on the $1^{st}$ symbol in the $1^{st}$ time slot according to the first configuration of the SSB 3; and the PDSCH of the RMSI 3 corresponding to the SSB 3 is received on the $8^{th}$ to the $B^{th}$ symbol of the $1^{st}$ time slot according to the third configuration in the PDCCH of the RMSI 3 corresponding to the SSB 3.

B is 12 or 13. The example is described taking B being 13 as an instance.

However, in some examples, the base station may possibly adopt an SSB sending mode in FIG. 4, or may possibly adopt an SSB sending mode in FIG. 6. When the SSB sending mode in FIG. 4 is adopted, the $8^{th}$ to the $13^{th}$ symbols in each time slot may be all or mostly occupied by the PDSCH; and when the SSB sending mode in FIG. 6 is adopted, a part of the $8^{th}$ to the $13^{th}$ symbols except the SSB in each time slot are occupied by the PDSCH. The UE needs to be aware of the SSB sending mode of the base station so as to adopt a reasonable rate matching mode.

Figure 7:
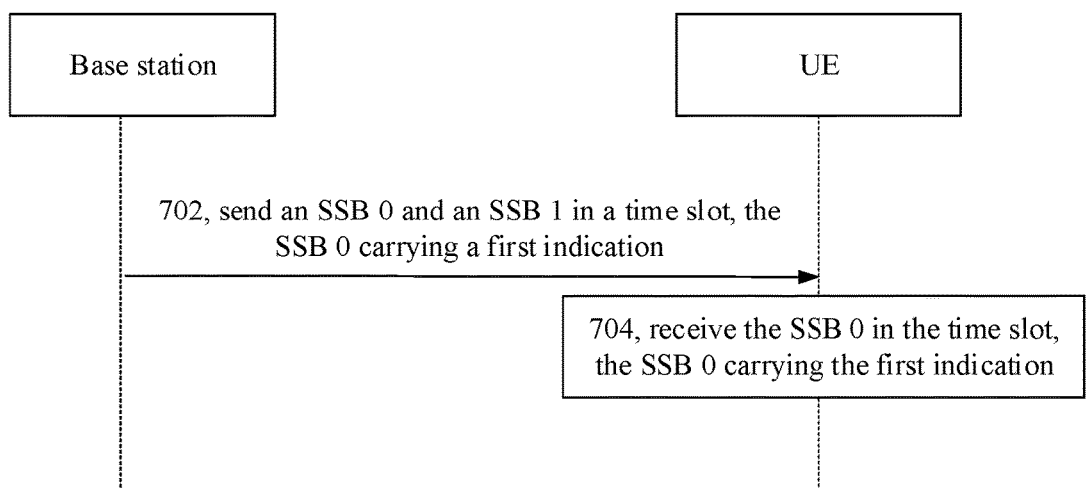
FIG. 7 is a flow chart of a rate matching indication method illustrated by an example.

FIG. 7 illustrates a flow chart of a rate matching indication method provided by an example of the disclosure. The method includes:

Step 702, the base station sends the SSB 0 and the SSB 1 in one time slot. The SSB 0 carries a first indication, and the first indication is used for indicating, to a terminal, that a rate matching mode of deducting a time-frequency resource occupied by the SSB 1 is adopted.

The SSB 0 occupies the $2^{nd}$ to the $6^{th}$ symbols in the time slot; and the SSB 1 occupies the $8^{th}$ to the $11^{th}$ symbols in the time slot.

In one instance, the first indication is 1 bit.

In one instance, the first indication is an SCS indication domain in PBCH of the SSB 0. Because the NR-U fixes the SCS to be 30 kHZ, the SCS indication domain may be multiplexed for sending the first indication.

Step 704, the terminal receives the SSB 0 in one time slot. The SSB 0 carries the first indication, and the first indication is used for indicating the rate matching mode of deducting the time-frequency resource occupied by the SSB 1.

To sum up, in the method provided by the example, the base station adopts one bit to indicate the rate matching mode to the terminal, so that the UE can adopt a reasonable rate matching mode to receive downlink data.

It can be seen from the above examples that, the base station in the example in FIG. 7 may adopt the SSB sending mode shown in FIG. 6, so the SSB 0 and the SSB 1 in the example in FIG. 7 may be substituted by the SSB 2 and the SSB 3. Details of implementation will not be repeated here.

Figure 8:
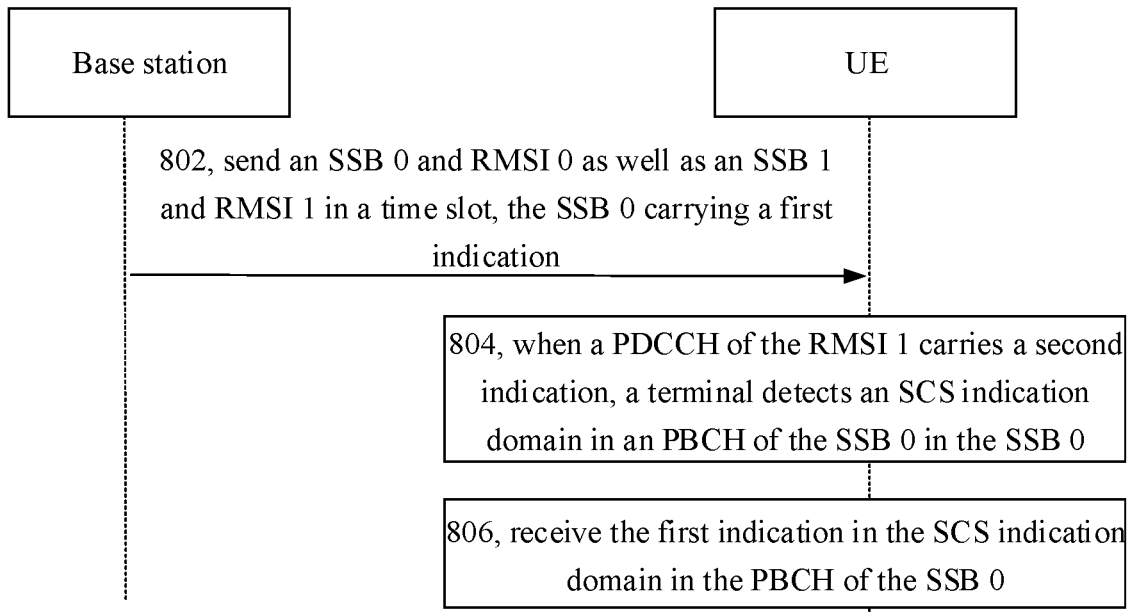
FIG. 8 is a flow chart of a rate matching indication method illustrated by an example.

FIG. 8 illustrates a flow chart of a rate matching indication method provided by an example of the present disclosure. The method includes:

Step 802, the base station sends the SSB 0 and the RMSI 0, as well as the SSB 1 and the RMSI 1 in one time slot. The SSB 0 carries the first indication, and the first indication is used for indicating, to the terminal, that the rate matching mode of deducting the time-frequency resource occupied by the SSB 1 is adopted.

The SSB 0 occupies the $2^{nd}$ to the $6^{th}$ symbols in the time slot; and the SSB 1 occupies the $8^{th}$ to the $11^{th}$ symbols in the time slot.

In one instance, the first indication is 1 bit.

In one instance, the first indication is the SCS indication domain in the PBCH of the SSB 0. Because the NR-U fixes the SCS to be 30 kHZ, the SCS indication domain may be multiplexed for sending the first indication.

It can be seen in combination with FIG. 6 that, the base station further sends the RMSI 0 corresponding to the SSB 0, and the RMSI 1 corresponding to the SSB 1 in the time slot. A second indication is sent in the PDCCH of the RMSI 1, and the second indication is used for indicating that a starting symbol of the PDSCH of the RMSI 1 is the $8^{th}$ symbol in the time slot. In one instance, the second indication is that a resource configuration index of the PDSCH is 13.

Step 804, when the PDCCH of the RMSI 1 carries the second indication, the terminal detects the SCS indication domain in the PBCH of the SSB 0 in the SSB 0.

Step 806, the terminal receives the first indication in the SCS indication domain in the PBCH of the SSB 0.

When a value of 1 bit in the SCS indication domain is a first value (such as 1), it is considered that the first indication is received, and the first indication is used for indicating the rate matching mode of deducting the time-frequency resource occupied by the SSB 1 in the time domain. Or, the first indication is used for indicating a rate matching mode of deducting the time-frequency resource occupied by the SSB 1 in the $8^{th}$ to the $13^{th}$ symbols in the time domain.

When the value of 1 bit in the SCS indication domain is a second value (such as 0), it is considered that a third indication is received, and the third indication is used for indicating a rate matching mode of not deducting the time-frequency resource occupied by the SSB 1 in the time domain. Or, the third indication is used for indicating a rate matching mode that the $8^{th}$ to the $13^{th}$ symbols in the time slot are all considered to be occupied by the PDSCH.

In the above examples, steps executed by the base station may be realized as a method on an access network side, and steps executed by the UE may be realized as a method on a UE side.

Figure 9:
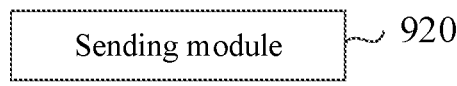
FIG. 9 is a block diagram of a rate matching indication apparatus illustrated by an example.

FIG. 9 illustrates a block diagram of a rate matching indication apparatus provided by an example of the disclosure. The apparatus includes:

a sending module 920, configured to send an SSB 0 and an SSB 1 in a time slot. The SSB 0 carries a first indication, and the first indication is used for indicating, to a terminal, that a rate matching mode of deducting a time-frequency resource occupied by the SSB 1 is adopted.

In one possible example, the first indication is 1 bit.

In one possible example, the first indication is an SCS indication domain in a PBCH of the SSB 0.

In one possible example, the time slot includes 14 symbols.

The SSB 0 occupies the $2^{nd}$ symbol to the $6^{th}$ symbol in the time slot.

The SSB 1 occupies the $8^{th}$ symbol to the $11^{th}$ symbol in the time slot.

In one possible example, the sending module 920 is further configured to send RMSI 0 corresponding to the SSB 0 and RMSI 1 corresponding to the SSB 1 in the time slot.

In one possible example, PDCCH of the RMSI 1 carries a second indication, and the second indication is used for indicating that a starting symbol of a PDSCH of the RMSI 1 is the $8^{th}$ symbol in the time slot.

In one possible example, the second indication is that a resource configuration index of the PDSCH is 13.

Figure 10:
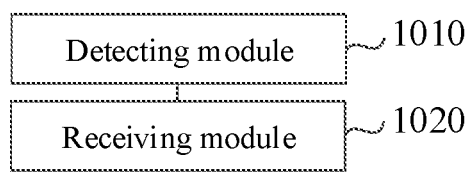
FIG. 10 is a block diagram of a rate matching indication apparatus illustrated by an example.

FIG. 10 illustrates a block diagram of a rate matching indication apparatus provided by an example of the disclosure. The apparatus includes:

a receiving module 1020, configured to receive an SSB 0 in a time slot. The SSB 0 carries a first indication, and the first indication is used for indicating a rate matching mode of deducting a time-frequency resource occupied by an SSB 1 in the time slot.

In one possible example, the first indication is 1 bit.

In one possible example, the first indication is an SCS indication domain in a PBCH of the SSB 0.

In one possible example, the time slot further carries a PDCCH of RMSI 1 corresponding to the SSB 1.

The apparatus further includes:

a detecting module 1010, configured to detect, when the PDCCH of the RMSI 1 carries a second indication, the SCS indication domain in the PBCH of the SSB 0 in the SSB 0.

The second indication is used for indicating that a starting symbol of a PDSCH of the RMSI 1 is the $8^{th}$ symbol in the time slot.

In one possible example, the second indication is that a resource configuration index of the PDSCH is 13.

Figure 11:
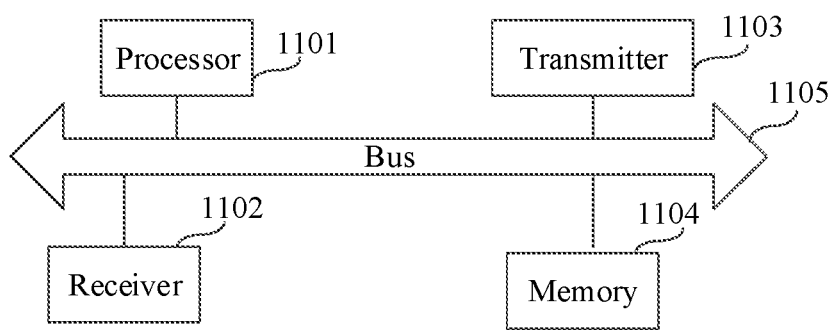
FIG. 11 is a schematic structural diagram of an access network device illustrated by an example.

FIG. 11 illustrates a schematic structural diagram of an access network device provided by an example of the disclosure. The access network device includes: a processor 1101, a receiver 1102, a transmitter 1103, a memory 1104, and a bus 1105.

The processor 1101 includes one or more than one processing cores, and the processor 1101 executes various functional applications and information processing by running software programs and modules.

The receiver 1102 and the transmitter 1103 may be implemented as one communication component, and the communication component may be a communication chip.

The memory 1104 is connected to the processor 1101 through the bus 1105.

The memory 1104 may be used to store at least one instruction, and the processor 1101 is used to execute the at least one instruction so as to realize the steps in the above method examples.

In addition, the memory 1104 may be implemented by any type of volatile or non-volatile storage devices or a combination of them. The volatile or non-volatile storage devices include, but are not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM), etc.

In an example, a non-transitory computer readable storage medium including instructions is further provided, such as a memory including the instructions. The instructions may be executed by a processor of an access network device to complete the above method. For instance, the non-transitory computer readable storage medium may be an ROM, a random access memory (RAM), a CD-ROM, a magnetic tape, a floppy disk, an optical data storage device, etc.

In the non-transitory computer readable storage medium, when the instructions in the non-transitory computer readable storage medium are executed by the processor of the access network device, the access network device can execute the above method.

Figure 12:
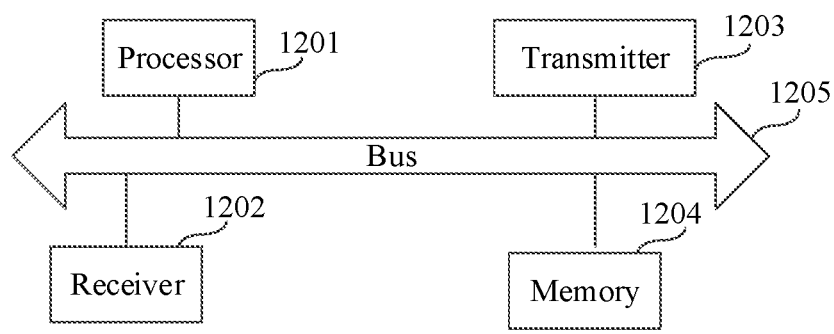
FIG. 12 is a schematic structural diagram of a terminal illustrated by an example.

FIG. 12 illustrates a schematic structural diagram of a terminal provided by an example of the disclosure. The terminal includes: a processor 1201, a receiver 1202, a transmitter 1203, a memory 1204, and a bus 1205.

The processor 1201 includes one or more than one processing cores, and the processor 1201 executes various functional applications and information processing by running software programs and modules.

The receiver 1202 and the transmitter 1203 may be implemented as one communication component, and the communication component may be a communication chip.

The memory 1204 is connected to the processor 1201 through the bus 1205.

The memory 1204 may be used to store at least one instruction, and the processor 1201 is used to execute the at least one instruction so as to realize the steps in the above method examples.

In addition, the memory 1204 may be implemented by any type of volatile or non-volatile storage devices or a combination of them. The volatile or non-volatile storage devices include, but are not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM), etc.

In an example, a non-transitory computer readable storage medium including instructions is further provided, such as a memory including the instructions. The instructions may be executed by a processor of a terminal to complete the above method. For instance, the non-transitory computer readable storage medium may be an ROM, a random access memory (RAM), a CD-ROM, a magnetic tape, a floppy disk, an optical data storage device, etc.

In the non-transitory computer readable storage medium, when the instructions in the non-transitory computer readable storage medium are executed by the processor of the terminal, the terminal can execute the above method.

An example of the disclosure further provides a computer readable storage medium. The computer readable storage medium stores at least one instruction, at least one program, a code set, or an instruction set, and the at least one instruction, the at least one program, the code set, or the instruction set is loaded and executed by a processor to implement the methods provided in the above method examples.

It should be understood that the "plurality" mentioned herein refers to two or more. "And/or" describes the association relationship of the associated objects, indicating that there can be three types of relationships, for example, A and/or B, can mean: A alone exists, A and B exist at the same time, and B exists alone. The character "/" generally indicates that the associated objects before and after are in an "or" relationship.

After considering the specification and practicing the disclosure disclosed herein, those skilled in the art will easily think of other implementations of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The specification and the examples are to be regarded as only, and the true scope and spirit of the disclosure are pointed out by the appended claims.

It should be understood that the disclosure is not limited to the exact construction that has been described above and illustrated in the accompanying drawings, and that various modifications and changes may be made without departing from the scope thereof. The scope of the disclosure is limited only by the appended claims.

What is claimed is:

1. A rate matching indication method, comprising:
sending, by an access network device of a new radio unlicensed independent networking (NR-U), synchronization signal blocks SSB 0 and SSB 1 in a time slot, wherein the SSB 0 carries a first indication, and the first indication indicates, to a terminal, that a rate matching mode of deducting a time-frequency resource occupied by the SSB 1 is adopted; wherein the first indication is a subcarrier spacing (SCS) indication domain in a physical broadcast channel (PBCH) of the SSB 0.

2. The method according to claim 1, wherein the first indication is 1 bit.

3. The method according to claim 1, wherein the time slot comprises 14 symbols;
the SSB 0 occupies the $2^{nd}$ symbol to the $5^{th}$ symbol in the time slot; and
the SSB 1 occupies the $8^{th}$ symbol to the $11^{th}$ symbol in the time slot.

4. The method according to claim 1, further comprising:
sending remaining minimum system information RMSI 0 corresponding to the SSB 0 and remaining minimum system information RMSI 1 corresponding to the SSB 1 in the time slot.

5. The method according to claim 4, wherein a physical downlink control channel (PDCCH) of the RMSI 1 carries a second indication, and the second indication indicates that a starting symbol of a physical downlink share channel (PDSCH) of the RMSI 1 is the $8^{th}$ symbol in the time slot.

6. The method according to claim 5, wherein,
the second indication is that a resource configuration index of the PDSCH is 13.

7. A rate matching indication method, comprising:
receiving, by a terminal of a new radio unlicensed independent networking (NR-U), a synchronization signal block SSB 0 in a time slot, wherein the SSB 0 carries a first indication, and the first indication indicates a rate matching mode of deducting a time-frequency resource occupied by a synchronization signal block SSB 1 in the time slot; wherein the first indication is a subcarrier spacing (SCS) indication domain in a physical broadcast channel (PBCH) of the SSB 0.

8. The method according to claim 7, wherein the first indication is 1 bit.

9. The method according to claim 7, wherein the time slot further carries a physical downlink control channel (PDCCH) of remaining minimum system information RMSI 1 corresponding to the SSB 1; and
the method further comprises:
detecting, in response to determining that the PDCCH of the RMSI 1 carries a second indication, the subcarrier spacing (SCS) indication domain in the PBCH of the SSB 0 in the SSB 0; wherein
the second indication indicates that a starting symbol of a physical downlink share channel (PDSCH) of the RMSI 1 is the $8^{th}$ symbol in the time slot.

10. The method according to claim 9, wherein the second indication is that a resource configuration index of the PDSCH is 13.

11. A terminal, comprising:
a processor; and
a memory, storing an executable instruction; wherein
the processor is configured to load and execute the executable instruction so as to realize the rate matching indication method according to claim 7.

12. An access network device, comprising:
a processor; and
a memory, storing an executable instruction; wherein
the processor is configured to send synchronization signal blocks SSB 0 and SSB 1 in a time slot, wherein the SSB 0 carries a first indication, and the first indication indicates, to a terminal, that a rate matching mode of deducting a time-frequency resource occupied by the SSB 1 is adopted; wherein the first indication is a subcarrier spacing (SCS) indication domain in a physical broadcast channel (PBCH) of the SSB 0.

13. The device according to claim 12, wherein the first indication is 1 bit.

14. The device according to claim 12, wherein the time slot comprises 14 symbols;
the SSB 0 occupies the $2^{nd}$ symbol to the $5^{th}$ symbol in the time slot; and
the SSB 1 occupies the $8^{th}$ symbol to the $11^{th}$ symbol in the time slot.

15. The device according to claim 12, wherein the processor is further configured to:
send remaining minimum system information RMSI 0 corresponding to the SSB 0 and remaining minimum system information RMSI 1 corresponding to the SSB 1 in the time slot.

16. The device according to claim 15, wherein a physical downlink control channel (PDCCH) of the RMSI 1 carries a second indication, and the second indication indicates that a starting symbol of a physical downlink share channel (PDSCH) of the RMSI 1 is the $8^{th}$ symbol in the time slot.

17. The device according to claim 16, wherein the second indication is that a resource configuration index of the PDSCH is 13.

* * * * *